United States Patent
Goshima et al.

[11] Patent Number: 6,086,493
[45] Date of Patent: Jul. 11, 2000

[54] CONTINUOUSLY VARIABLE TRANSMISSION

[75] Inventors: Hiroki Goshima; Yoshihisa Ito, both of Anjo, Japan

[73] Assignee: Aisin AW Co., Ltd., Japan

[21] Appl. No.: 09/000,619

[22] Filed: Dec. 30, 1997

[30] Foreign Application Priority Data

Jan. 16, 1997 [JP] Japan ................................. 9-005767

[51] Int. Cl.[7] ............................ F16H 55/56; F16C 43/00
[52] U.S. Cl. .................................. 474/50; 474/8; 384/538
[58] Field of Search ............................... 474/8, 18, 328, 474/43, 44, 165, 198; 384/538, 540, 199

[56] References Cited

U.S. PATENT DOCUMENTS

| | | | |
|---|---|---|---|
| 1,583,562 | 5/1926 | Stenner | 384/538 |
| 4,680,711 | 7/1987 | Miyawaki et al. | 364/424.1 |
| 5,176,579 | 1/1993 | Ohsono et al. | 474/18 |
| 5,527,226 | 6/1996 | Lamers | 474/43 |

*Primary Examiner*—David A. Bucci
*Assistant Examiner*—Colby Hansen
*Attorney, Agent, or Firm*—Lorusso & Loud

[57] ABSTRACT

In a continuously variable transmission, a hydraulic actuator for axially moving a movable sheave has an outer cylinder which includes a radial portion extending radially from a boss on the stationary sheave. A bearing is disposed abutting the surface of the radial portion. The inner race of the bearing has a large diameter so that the inner race contacts at least a predetermined area of the surface of the radial portion, preferably, the entire area of that surface. One side of the inner race has a recess in which a nut for axially fixing the outer cylinder, the bearing and the like is disposed, thereby reducing the axial dimension of the continuously variable transmission.

10 Claims, 4 Drawing Sheets

CONTINUOUSLY VARIABLE TRANSMISSION

BACKGROUND OF THE INVENTION

1. Field of the Invention

The invention relates to a continuously variable transmission having two pulleys, each formed of a stationary sheave and a movable sheave, and a belt disposed on the two pulleys and, more particularly, to a support construction for a stationary sheave of a continuously variable transmission suitable for use in a motor vehicle.

2. Description of the Related Art

A continuously variable transmission is disclosed in U.S. Pat. No. 4,680,711. As shown in FIG. 1 here, this prior art continuously variable transmission 200 includes a primary pulley 202 and a secondary pulley 203 that are rotatably supported by a case 201, and a belt 205 disposed on the pulleys 202, 203. Each pulley is formed of a stationary sheave 206 or 207 and a movable sheave 209 or 210. The movable sheaves 209 and 210 are axially moved by hydraulic actuators 211 and 212, respectively.

The primary-side hydraulic actuator 211 has a cylinder member 213, and an annular member 216 disposed on the movable sheave 209 so that a hydraulic chamber 215 is formed between the annular member 216 and the cylinder member 213. The movable sheave 209 is moved by supplying hydraulic pressure into the hydraulic chamber 215 to effect a "shift."

The cylinder member 213 is fitted over a boss portion 206*a* of the stationary sheave 206. On the rear side of the cylinder member 213, a washer 220 is fitted over the boss portion 206*a*. A bearing 221 for rotatably supporting the stationary sheave 206 and a nut 222 for fixing these members in position are also fitted over the boss portion 206*a* of the stationary sheave 206.

However, the continuously variable transmission 200 has the problem of a large axial dimension, i.e. the dimension set by the rotating axes of the transmission, due to the presence of the washer 220 and the bearing 221 disposed between the cylinder member 213 and the nut 222.

To reduce the axial dimension of the transmission, the washer 220 can be omitted. However, because the washer 220 serves as a reinforcement for the cylinder member 213, which bears high hydraulic pressure within the hydraulic chamber 215, omission of the washer 220 will create a new problem in that the base end portion of the cylinder member 213 contacting the boss portion 206*a* may deform.

To prevent deformation of the cylinder member 213 with omission of the washer 220, several approaches are possible, for example:

(1) the plate thickness of the cylinder member may be increased;

(2) a stronger material may be used to form the cylinder member; and (3) the cylinder member may be subjected to an appropriate heat treatment.

However, (1) still has the problem of increased axial dimension and (2) and (3) have problems of increased cost of component parts and overall production.

SUMMARY OF THE INVENTION

Accordingly, it is an object of the invention to provide a continuously variable transmission that has a reduced axial dimension.

It is another object of the invention is to prevent deformation of the cylinder member.

According to the present invention, there is provided a continuously variable transmission including a pair of pulleys, and a belt disposed on the pulleys. Each pulley has a stationary sheave rotatably supported by the case, a movable sheave which is axial movable relative to the stationary sheave and which is rotatable together with the stationary sheave, and a hydraulic actuator for axially moving the movable sheave. A bearing rotatably supports the stationary sheave of at least one of the pulleys on the case. A fixing means is provided for fixing the bearing in axial position relative to the stationary sheave. At least a portion of the fixing means is disposed within the bearing.

Since at least a portion of the fixing means is disposed within the bearing, the axial dimension of the continuously variable transmission is reduced.

In a preferred embodiment, the bearing has a diameter that is greater than the diameter of the fixing means, and the inner race has a recess in which at least a portion of the fixing means is disposed so that the fixing means axially overlaps the bearing. With this optional structure, the axial dimension of the continuously variable transmission can be reduced.

In accordance with another optional feature, the continuously variable transmission may further have a hydraulic actuator which includes an annular member fixed on the movable sheave and a cylinder member disposed so that a hydraulic chamber is formed between the cylinder member and the annular member wherein the cylinder member has an axially extending projection with the bearing disposed so that its inner race contacts the projection. The cylinder member is fixed in position together with the bearing by the fixing element, e.g. nut, or other means.

Thus, according to the present invention, the strength of the cylinder member in the axial direction is increased, so that deformation of the cylinder member can be prevented. Since the inner race of the bearing reinforces the cylinder member, there is no need to provide a separate reinforcing member. The number of component parts is thus minimized, thereby allowing a cost reduction and a reduction of the axial dimension of the continuously variable transmission. Furthermore, there is no need to increase the thickness of the plate forming the cylinder member for sake of strength, thus allowing a further reduction of the axial dimension of the continuously variable transmission. Further, since there is no need for use of a stronger material for the cylinder member or heat treatment of the cylinder member to increase strength, the costs of parts and production can be correspondingly reduced.

The fixing means may be a nut threaded onto a boss of the stationary sheave.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein.

DETAILED DESCRIPTION OF PREFERRED EMBODIMENT

A preferred embodiment of the invention will be described in detail hereinafter with reference to the accompanying drawings.

Figure 1:
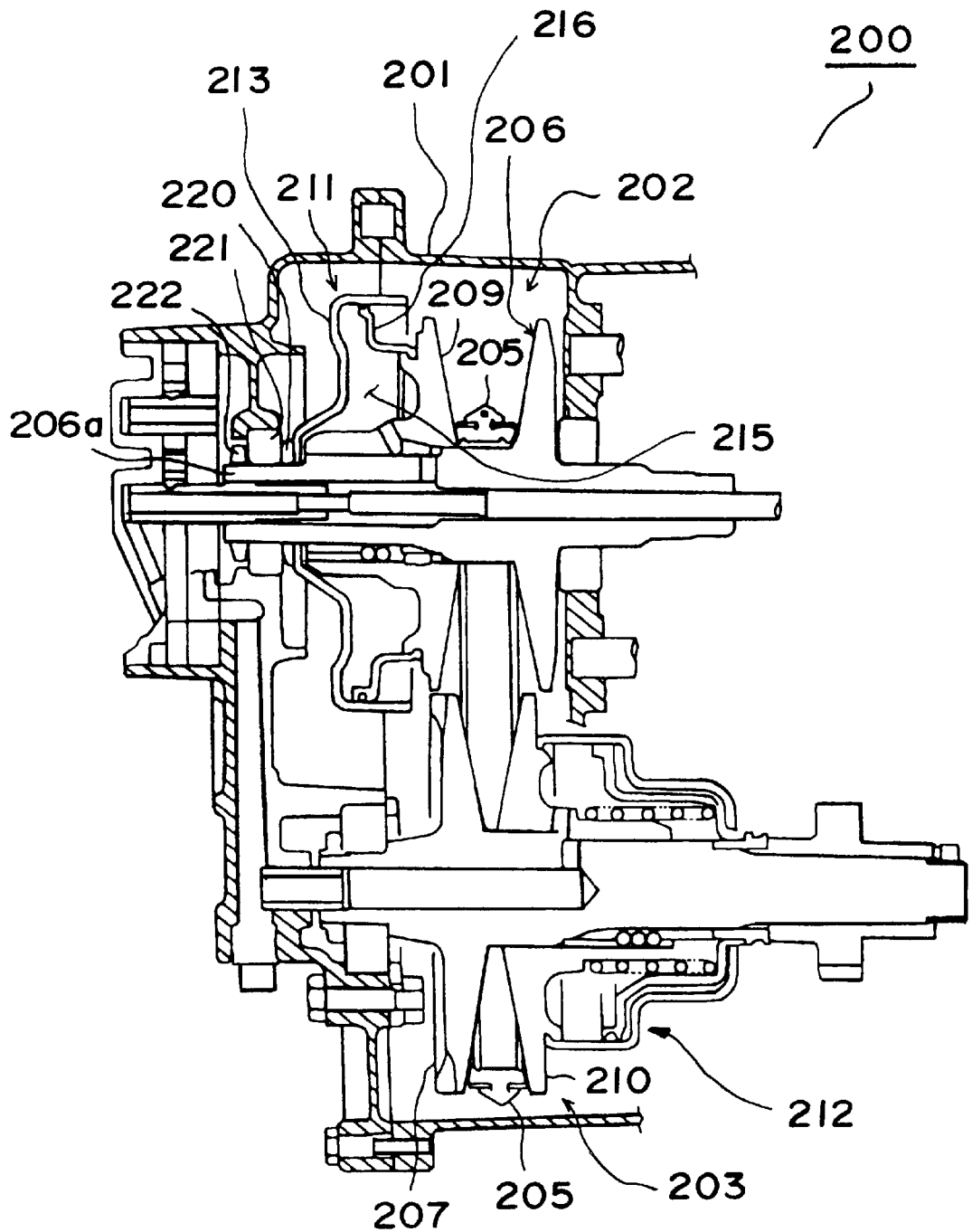
FIG. 1 is an axial cross-section of a continuously variable transmission of the prior art.
Figure 2:
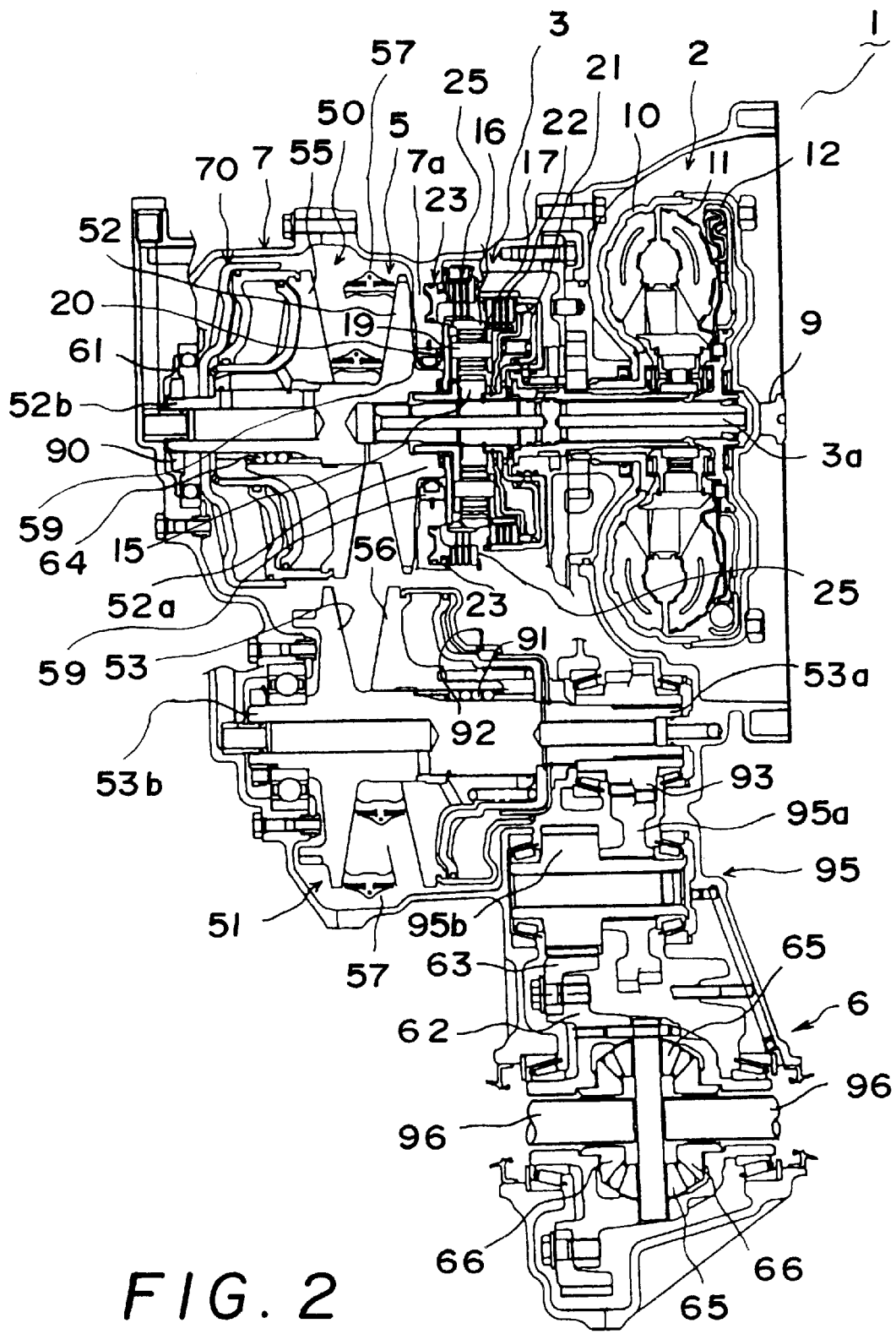
FIG. 2 is an axial cross-section showing the overall construction of an embodiment of a continuously variable transmission according to the invention.

Referring to FIG. 2, a vehicular transmission 1 has a fluid coupling (torque converter) 2, a forward-reverse drive switching mechanism 3, a belt-type continuously variable transmission (CVT) 5, and a differential device 6, which are disposed in a sectioned case 7.

The fluid coupling 2 has a pump impeller 10 connected to an engine output shaft 9, a turbine runner 11 connected to an input shaft 3a of the forward-reverse drive switching mechanism 3, and a lockup clutch 12 for directly coupling the input shaft 3a to the engine output shaft 9.

The forward-reverse drive switching mechanism 3 has a planetary gear unit 20 formed of a sun gear 15 fixed to the input shaft 3a, a rotatably supported ring gear 16, pinion gears 17 meshing with the sun gear 15 and the ring gear 16, and a carrier 19 supporting the pinion gears 17.

A direct coupling clutch 22, operated by a hydraulic actuator 21, is disposed between the input shaft 3a and the carrier 19. By engagement of the direct coupling clutch 22, the input shaft 3a is directly coupled to the carrier 19. The other end of the carrier 19 is spline-coupled to a stationary sheave 52 (detailed below).

The ring gear 16 is connected to a reverse brake 25. By operating the reverse brake 25 through a hydraulic actuator 23, the ring gear 16 can be stopped from rotating.

The construction of the hydraulic actuator 23 and the construction of the mounting structure of the hydraulic actuator 23 will now be described.

Figure 3:
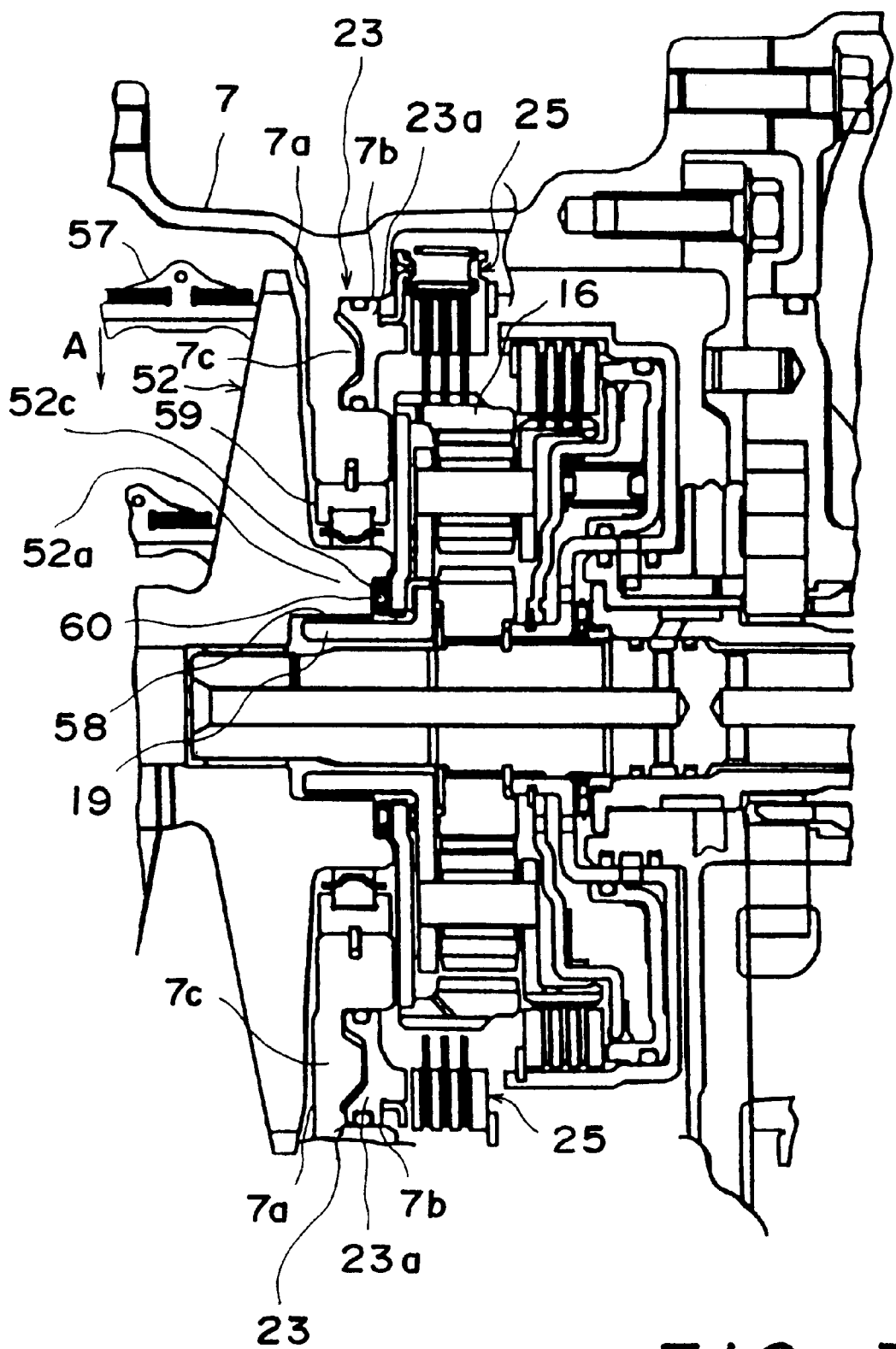
FIG. 3 is an enlarged cross-section of a portion of the structure shown in FIG. 2 showing details of construction of a forward-reverse drive switching mechanism and other members.

A protrusion 7a of the case 7 faces a side of the reverse brake 25 as shown in FIG. 3. The protrusion 7a surrounds the input shaft 3a has an annular cylinder portion 7b that opens toward the reverse brake 25. An annular piston 23a is slidably disposed in the cylinder portion 7b. The cylinder portion 7b and the piston 23a thereby form the hydraulic actuator 23. A thick-wall portion 7c forms the bottom of the cylinder portion 7b. The thick-wall portion 7c provides an additional increment of strength to the protrusion 7a. Corresponding to the thick-wall portion 7c, the piston 23a has a recessed pressure-receiving surface.

In this preferred embodiment, the cylinder portion 7b of the hydraulic actuator 23 is formed deep within the protrusion 7a, extending close to the stationary sheave 52, so that the hydraulic actuator 23 is disposed substantially radially aligned with the large-diameter bearing 59.

CVT 5 has a primary pulley 50 and a secondary pulley 51 as shown in FIG. 2. A metallic belt 57 is disposed around the pulleys 50, 51.

The primary pulley 50 has a stationary sheave 52, which has a generally cylindrical thick-walled first boss portion 52a extending toward the forward-reverse drive switching mechanism 3, and a generally cylindrical thick-walled second boss portion 52b extending from the opposite side. The large-diameter bearing 59 is disposed between the outer peripheral surface of the first boss portion 52a and the protrusion 7a of the case 7. A bearing 61 (detailed below) is disposed between the second boss portion 52b and the case 7. Thus, the stationary sheave 52 is rotatably supported by the case 7 through the two bearings 59, 61.

FIG. 3 shows a splined coupling 58 between the carrier 19 and the inner peripheral surface of the first boss portion 52a. The splined coupling 58 axially overlaps the large-diameter bearing 59. The carrier 19 is connected to the stationary sheave 52 by the splined coupling 58 so that the carrier 19 rotates together with the stationary sheave 52 to transmit rotation from the forward-reverse drive switching mechanism 3 to the primary pulley 50. An annular recess 52c is formed in the distal end of the first boss portion 52a. A small-diameter bearing 60 is disposed in the recess 52c so that the small-diameter bearing 60 axially overlaps the large-diameter bearing 59. The ring gear 16 is rotatably supported by the stationary sheave 52 through the small-diameter bearing 60.

A movable sheave 55 is supported by the second boss portion 52b of the stationary sheave 52 through a ball spline 64 so that the movable sheave 55 can be axially moved relative to the stationary sheave 52 and can be rotated together with the stationary sheave 52.

The movable sheave 55 is axially moved by a double-piston type hydraulic actuator 70.

Figure 4:
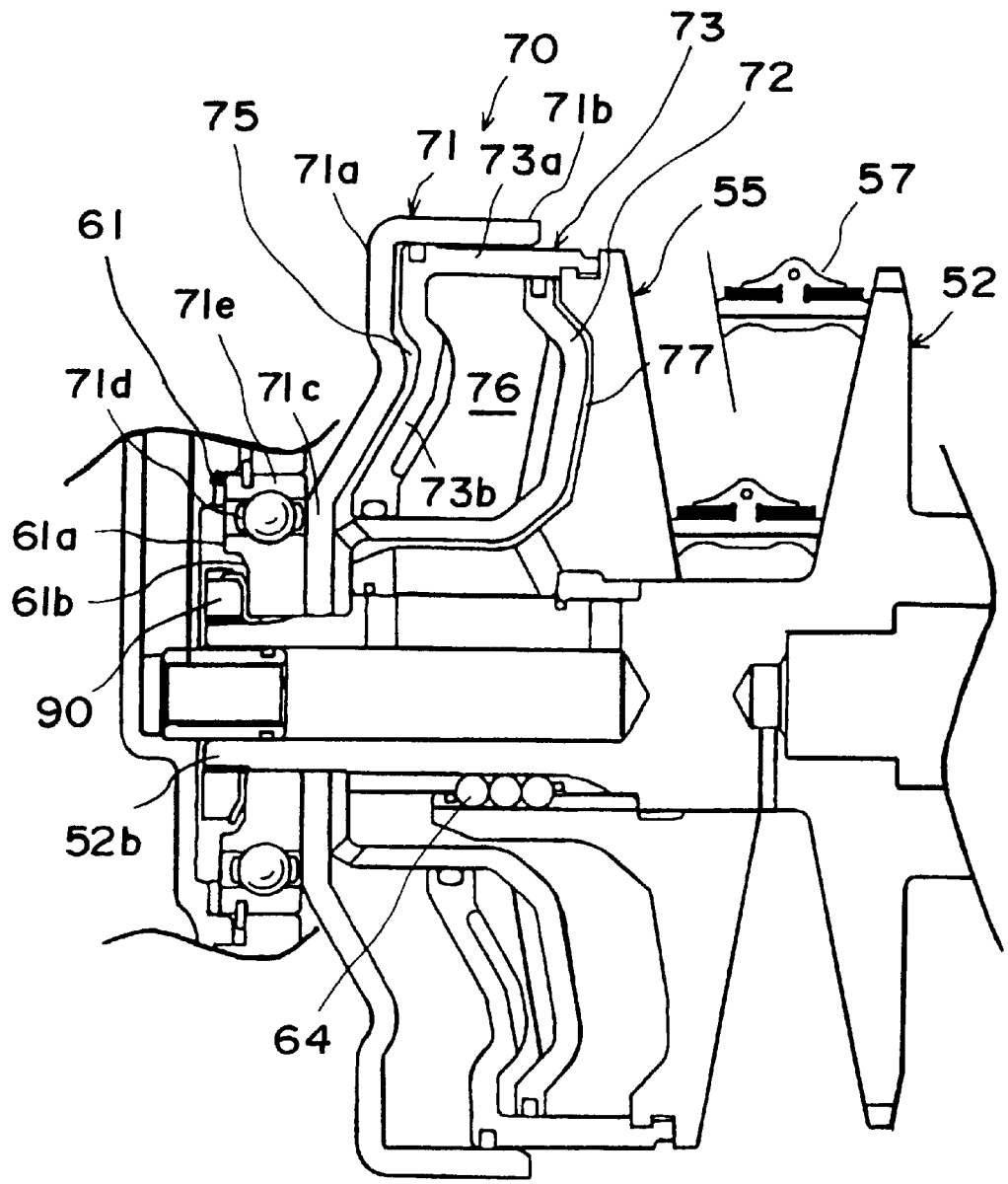
FIG. 4 is an axial cross-section of the primary pulley and its hydraulic operator with their support structure, which structure is included in the embodiment shown in FIG. 2.

As shown in FIG. 4, the hydraulic actuator 70 is formed of an outer cylinder (cylinder member) 71 and an inner cylinder 72 that are fitted over and fixed to the second boss portion 52b of the stationary sheave 52, and a piston member (annular member) 73 fixed to an outer peripheral portion of the movable sheave 55 by caulking (press fit).

The outer cylinder 71 is formed of a radially extending portion 71a, in the form of an umbrella, a central portion 71c extending from the second boss portion 52b to portion 71a, and an annular portion 71b extending from the portion 71a to a distal end. The bearing 61 is disposed on the rear side surface (left-side surface in FIG. 4) of outer cylinder portion 71c.

An inner race 61a of the bearing 61 has a large diameter, and contacts at least a predetermined area of the rear surface of the portion 71c, more preferably, the entire area of the rear surface of portion 71c. On the rear surface (left-side surface in FIG. 4) of the inner race 61a, a nut (fixing element) 90 is screwed onto the second boss portion 52b. The nut 90 thus fixes the outer cylinder 71, the inner cylinder 72 and the bearing 61 in position relative to the stationary sheave 52. The inner race 61a has a diameter that is larger than the diameter of the nut 90. A rear side (left side in FIG. 4) portion of the inner race 61a has a recess 61b whose diameter is larger than the diameter of the nut 90. At least a portion of the nut 90 is disposed in the recess 61b, so that at least a portion of the nut 90 axially overlaps at least portion of the bearing 61.

The inner cylinder 72 has a curved shape such that the inner cylinder 72 extends along (mates with) the rear surface of the movable sheave 55. The piston member 73 has an annular portion 73a that axially extends from its fixed (caulked) connection to movable sheave 55 so as to slidingly contact both the annular portion 71b of the outer cylinder 71 (on its inner surface) and a peripheral edge of the inner cylinder 72. Piston member 73 further includes a piston portion 73b that is integral with and extends generally radially inward from the annular portion 73a. A hydraulic chamber 75 is thereby formed between the piston portion 73b and the outer cylinder 71. The rear surface of the movable sheave 55 thus serves as a piston surface such that another hydraulic chamber 77 is formed between that rear surface and the inner cylinder 72.

The secondary pulley 51 has substantially the same construction as the primary pulley 50. That is, the secondary pulley 51 has a stationary sheave 53 that is rotatably supported by the case 7 (see FIG. 2). A movable sheave 56 is supported by the stationary sheave 53 through a ball spline connection 91 so that the movable sheave 56 can be axially moved relative to the stationary sheave 53 and can be rotated together with the stationary sheave 53. The movable sheave 56 is axially moved by a hydraulic actuator 92 disposed on the rear side of the movable sheave 56.

As shown in FIG. 2, an output gear 93 is fixed to a boss 53$a$integral with the stationary sheave 53. Disposed below the output gear 93 are a speed-reducing gear mechanism 95 and a differential mechanism 6. The speed-reducing gear mechanism 95 has a large gear 95$a$ and a small gear 95$b$ that are disposed coaxially so that they rotate together. The differential mechanism 6 has a ring gear 63 that is fixed to a differential case 62 so as to rotate together with the case 62, a pair of differential gears 65 supported by a shaft in the differential case 62, and a pair of sun gears 66 respectively meshing with the two differential gears 65. The two sun gears 66 are respectively connected to the right and left front axle shafts 96, and output differential rotations thereto. The output gear 93, fixed to the stationary sheave 53, meshes with the large gear 95$a$ of the speed-reducing gear mechanism 95. The small gear 95$b$ of the speed-reducing gear mechanism 95 meshes with the ring gear 63 of the differential mechanism 6.

The operation of this embodiment will now be described with reference to FIG. 2.

Rotation of the engine output shaft 9 is transmitted to the input shaft 3$a$ by the fluid coupling 2. If the direct clutch 22 is engaged and the reverse brake 25 is released, direct connection is established between the input shaft 3$a$ and the stationary sheave 52, where rotation of the input shaft 3$a$ is directly transmitted to the stationary sheave 52 by the carrier 19. The primary pulley 50 is thereby rotated forward. Rotation of the primary pulley 50 is transmitted to the secondary pulley 51 by the belt 57, and then transmitted, by the output gear 93 and the speed-reducing gear mechanism 95, to the differential mechanism 6.

If the movable sheaves 55, 56 are moved axially by the hydraulic actuators 70, 92, the positions of contact between the belt 57 and the pulleys 50, 51 change radially, so that the rotating speed transmitted from the primary pulley 50 to the secondary pulley 51 is thereby changed.

If the direct clutch 22 is released and the reverse brake 25 is engaged, the rotation of the ring gear 63 is stopped, so that reverse rotation is transmitted to the stationary sheave 52. Reverse rotation of the primary pulley 50 is transmitted to the differential mechanism 6 by the belt 57, the secondary pulley 51, the output shaft 93 and the speed-reducing gear mechanism 95, as described above.

Advantages of this preferred embodiment will now be described.

In the above-described embodiment, the recess 61$b$ is formed in the inner race 61$a$, and at least a portion of the nut 90 is disposed in (extends axially into) the recess 61$b$, so that at a least portion of the nut 90 axially overlaps at least a portion of the bearing 61. Therefore, the axial dimension of the continuously variable transmission can be reduced.

The inner race 61$a$ of the bearing 61 is increased in diameter, to the extent that the inner race 61$a$ contacts at least a predetermined area of the rear surface of the portion 71$c$ of the outer cylinder 71 (preferably, the entire area of the rear surface of the inner radially extending portion 71$c$). Therefore, the strength of the outer cylinder 71 in the axial direction is increased, so that the outer cylinder 71 is protected from deforming.

The inner race 61$a$ of the bearing 61 reinforces the outer cylinder 71, so that it becomes unnecessary to provide a separate reinforcing member. Therefore, the number of component parts is minimized, allowing a cost reduction and a reduction in the axial dimension. Furthermore, since it becomes unnecessary to increase the plate thickness of the outer cylinder 71 to provide additional strength, the axial dimension of the continuously is variable transmission can be further reduced. Since there is no need for a material of increased strength for the outer cylinder 71 or heat treatment of the outer cylinder 71 to increase its strength, the costs of component parts and of production can be correspondingly reduced.

Although the foregoing embodiment uses the nut 90 as a fixing element, it is also possible to employ other fixing means, such as caulking, swaging, welding, press-fitting, and the like. With any of such fixing means employed, the axial dimension of the continuously variable transmission can be reduced by forming a recess in the inner race 61$a$ and disposing at least a portion of the fixing means in the recess.

The teachings of pending Japanese Application Serial No. 9-5767, filed Jan. 16, 1997, inclusive of the specification, claims and drawings, are incorporated herein by reference.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A continuously variable transmission comprising:
   a pair of pulleys each having a stationary sheave rotatably supported by a case and having an axially extending boss, a movable sheave axially movable relative to said stationary sheave, said movable sheave being rotatable together with said stationary sheave, and a hydraulic actuator for axially moving said movable sheave;
   a belt disposed around said pulleys;
   a bearing through which said stationary sheave of at least one of said pulleys is rotatably supported by said case, said bearing including an inner race having a first diameter and an axial recess; and
   a fixing element, engaging an axially extending portion of said boss, for fixing said bearing in an axial position relative to said stationary sheave, said fixing element having a second diameter less than the first diameter and wherein at least a portion of said fixing element extends axially within said recess, whereby said inner race axially overlaps said fixing element and said portion of said boss.

2. A continuously variable transmission according to claim 1, wherein:
   said hydraulic actuator comprises an annular member fixed to said movable sheave, and a cylinder member disposed so that a hydraulic chamber is formed between said cylinder member and said annular member;
   said cylinder member has an axially extending cylindrical wall portion and, depending from said wall portion a bottom closing one end of the cylinder member and including an axially offset, radially extending radial portion;
   wherein said inner race has a side surface in contact with a radially extending surface of said radial portion; and said cylinder member is axially fixed in position together with said bearing by said fixing means.

3. A continuously variable transmission according to claim 2, wherein said fixing element is a nut threaded onto said boss.

4. A continuously variable transmission according to claim 2 wherein a major portion of said radially extending surface is in contact with said side surface.

5. A continuously variable transmission according to claim 2 wherein the entirety of said radially extending surface is in contact with said side surface.

6. A continuously variable transmission according to claim 1, wherein said fixing element is a nut threaded onto said boss.

7. A continuously variable transmission according to claim 1 wherein:

said hydraulic actuator comprises an annular member fixed to said movable sheave and a cylinder member disposed so that a hydraulic chamber is formed between said cylinder member and said annular member;

said cylinder member has an axially extending cylindrical wall portion and, depending from said wall portion, a bottom closing one end of the cylindrical wall portion, said bottom comprising:

a first radial portion extending radially inward from said cylindrical wall portion;

a connecting portion extending radially inward from said first radial portion and axially away from said cylindrical wall portion; and a second radial portion extending radially inward from said connecting portion and connecting with said boss on said stationary sheave; and said cylinder member is axially fixed in position together with said bearing by said fixing element.

8. A continuously variable transmission according to claim 7, wherein said fixing element is a nut threaded onto said boss.

9. A continuously variable transmission according to claim 7 wherein a major portion of said radially extending surface is in contact with said side surface.

10. A continuously variable transmission according to claim 7, wherein said bearing includes an inner race which has a diameter greater than that of a fixing element which serves as said fixing means, and said inner race has a recess in which at least a portion of said fixing element is disposed so that said fixing element axially overlaps said bearing.

* * * * *